(12) United States Patent
Stancil (10) Patent No.: US 7,584,501 B2
(45) Date of Patent: Sep. 1, 2009

(54) SYSTEM AND METHOD FOR AUTHORIZING USE OF A CONNECTION DEVICE COUPLED TO A PROCESSING SYSTEM

(75) Inventor: Charles J. Stancil, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 10/791,202

(22) Filed: Mar. 2, 2004

(65) Prior Publication Data

US 2005/0198399 A1 Sep. 8, 2005

(51) Int. Cl.
G06F 17/00 (2006.01)
G06F 1/26 (2006.01)
G06F 11/30 (2006.01)
G06F 15/16 (2006.01)
G06F 3/00 (2006.01)
G06F 1/00 (2006.01)

(52) U.S. Cl. .............................. 726/4; 726/17; 726/21; 726/27; 713/194; 713/169; 713/192; 713/193; 713/300; 709/228; 709/249; 710/11

(58) Field of Classification Search ....................... None
See application file for complete search history.

(56) References Cited

U.S. PATENT DOCUMENTS

| 5,515,440 | A | * | 5/1996 | Mooney et al. ............. 713/159 |
| 5,552,776 | A | | 9/1996 | Wade et al. |
| 6,065,081 | A | * | 5/2000 | Stancil et al. ............... 710/104 |
| 6,134,666 | A | * | 10/2000 | DeNicolo ................... 713/300 |
| 6,138,240 | A | * | 10/2000 | Tran et al. ..................... 726/19 |
| 6,166,688 | A | * | 12/2000 | Cromer et al. .......... 342/357.17 |
| 6,219,792 | B1 | * | 4/2001 | Bouthillier et al. .............. 726/9 |
| 6,351,817 | B1 | * | 2/2002 | Flyntz ............................ 726/4 |
| 6,499,073 | B1 | * | 12/2002 | Wallach et al. ............... 713/340 |
| 6,510,522 | B1 | * | 1/2003 | Heinrich et al. ............... 726/34 |
| 6,572,015 | B1 | * | 6/2003 | Norton ........................ 235/382 |
| 6,968,466 | B2 | * | 11/2005 | Bolian et al. ................. 713/300 |

(Continued)

OTHER PUBLICATIONS

"BeCrypt Limited: BeCrypt launches Connect Protect to help enterprises clamp down on growing security risks from portable USB device; Connect Protect prevents malicious use of mobile computing devices to leak corporate data and introduce viruses," Sep. 29, 2004, M2 Presswire.*
ExpressCard Standard, Candidate Draft 111303, ExpressCard Standard, Release 1.0, Document No. 1103-01-1500, First Printing, Nov. 2003.
ExpressCard Power—Interface Switch, TPS2231/TPS2236, Product Review.

*Primary Examiner*—Kaveh Abrishamkar (57) ABSTRACT

Embodiments of a device authorization system authorize a connection device to be communicatively coupled to a processing system. One embodiment comprises a communication system interface configured to receive authorization from a network administrator device for a processing system to communicatively couple to a connection device; a card detector to detect the presence of the connection device when coupled to the processing system; and a card power switch configured to receive an authorization signal when the processing system is authorized to communicatively couple to the connection device, and configured to supply power to the connection device only when the authorization signal is present and when the card detector detects the presence of the connection device.

16 Claims, 9 Drawing Sheets

U.S. PATENT DOCUMENTS

| | | | |
|---|---|---|---|
| 7,069,587 B2* | 6/2006 | Ito | 726/17 |
| 2003/0208698 A1* | 11/2003 | Chou et al. | 713/202 |
| 2003/0226004 A1* | 12/2003 | Abbondanzio et al. | 713/1 |
| 2004/0156151 A1* | 8/2004 | Morrow | 361/18 |
| 2005/0077355 A1* | 4/2005 | Yamamoto et al. | 235/439 |
| 2005/0138433 A1* | 6/2005 | Linetsky | 713/202 |

* cited by examiner

SYSTEM AND METHOD FOR AUTHORIZING USE OF A CONNECTION DEVICE COUPLED TO A PROCESSING SYSTEM

BACKGROUND

Processing systems, such as personal computers or the like, are designed to facilitate easy connectivity to a variety of other systems or peripheral devices. Connectivity between the processing system and other systems or devices is often accomplished using an intermediary connection device.

For example, a communications system, such as a telephone system, may be communicatively coupled to the processing system using an intermediary connection device, such as a modem, that is inserted into a receptacle, slot or the like on the processing system. Thus, when a modem card is inserted into a pre-configured card slot and a phone line is connected to the modem card, the processing device becomes communicatively coupled to the telephone system.

As another example, a printing device may be communicatively coupled to the processing system using an intermediary connection device, referred to as a Universal Serial Bus (USB) port, that is inserted into a receptacle, slot or the like on the processing system. Thus, when a USB port is inserted into a pre-configured card slot and a printing device is connected to the USB port, the processing device becomes communicatively coupled to the printing device.

Systems and peripheral devices are configured to communicate to the processing system using a specific communication format. One example of a communication format is referred to as the PCI (Peripheral Component Interconnect) format. Other formats include the USB format, ISA (Industry Standard Architecture), PCI Express, or various packet based communication formats.

As noted above, various types of intermediary connection devices are used to facilitate communicatively coupling of the processing system to another system or peripheral device. The above-described modem card (intermediary connection device) may be configured as a PCMCIA (Personal Computer Memory Card International Association) card that fits into a PCMCIA slot on the processing device. Another example of card-based devices includes the "ExpressCard" format that supports PCI Express or USB formats. Furthermore, wireless communication formats, such as infrared, radio frequency (RF) or other suitable communication mediums, may be used for communications between an intermediary connection device and the system or peripheral device.

When the user and the owner of the processing system are the same individual, decisions regarding what systems or peripheral devices are communicatively coupled to the processing system are made by the user/owner. However, in other situations, the owner and the user may be different. The owner may be an individual, or a type of organization, that owns many processing systems, such as personal computers (PCs) or work stations. In this situation, the user of the processing system could be an employee.

In situations where there are many processing systems used by a plurality of users, such as the employees, the owner may desire to control access between the plurality of processing systems and other systems or peripheral devices. The owner, or another authorized employee such as a network administrator, may determine which systems or peripheral devices should have access to the processing systems. Accordingly, it is desirable to control access by selectively authorizing the processing systems to have access to certain systems or peripheral devices, while denying access by withholding authorization to other systems or peripheral devices.

SUMMARY

Embodiments of a device authorization system provide for authorizing a connection device to be communicatively coupled to a processing system. Briefly described, one embodiment comprises a communication system interface configured to receive authorization from a network administrator device for a processing system to communicatively couple to a connection device; a card detector to detect the presence of the connection device when coupled to the processing system; and a card power switch configured to receive an authorization signal when the processing system is authorized to communicatively couple to the connection device, and configured to supply power to the connection device only when the authorization signal is present and when the card detector detects the presence of the connection device.

An embodiment of a process for authorizing connection devices comprises detecting presence of a connection device when coupled to a processing system, determining if the connection device is authorized to be communicatively coupled to the processing system, providing power to the connection device when the connection device is authorized to be communicatively coupled to the processing system and not providing power to the connection device when the connection device is not authorized to be communicatively coupled to the processing system.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
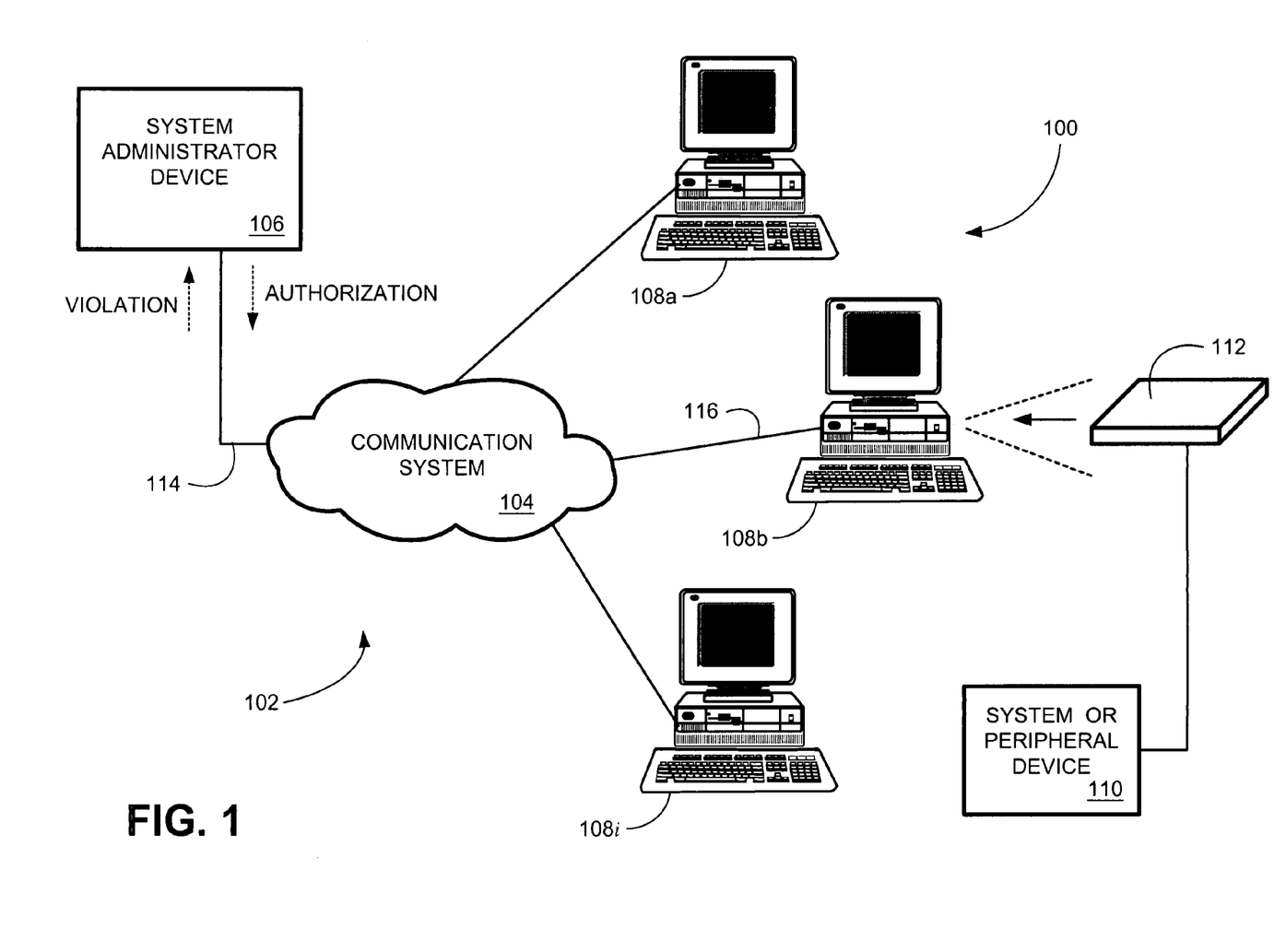
FIG. 1 is block diagram illustrating an embodiment of a processing system environment wherein a device authorization system is implemented.

FIG. 1 is block diagram illustrating an embodiment of a processing system environment 102 wherein a device authorization system 100 is implemented. Environment 102 comprises a communication system 104, a system administrator device 106 and a plurality of processing systems 108a-108i. Processing systems 108a-108i may be devices such as, but not limited to, personal computers (PCs), laptop computers or workstations. The system administrator device 106 may be any suitable device that allows an authorizing entity, such as the owner, a network administrator, system administrator, or other authorized individual to provide authorization for a system or peripheral device 110 to be communicatively coupled to a selected one(s) of the processing systems 108a-108i, using an intermediary connection device 112 described in greater detail hereinbelow.

For convenience, the connection device 112 is coupled to the processing system 108b. In one embodiment, the connection device 112 is a card device that is inserted into a card slot (not shown) on the processing system 108b.

Connection device 112 is an active device that requires power, which is provided by the processing system 108b. If authorized, the connection device 112 receives power from the processing system 108b. Accordingly, the connection device 112 facilitates the connectivity between the processing system 108b and the system or peripheral device 110 (when coupled to the connection device 112). However, if the connection device 112 is not authorized, connection device 112 does not receive power from the processing system 108b. In the absence of power, connection device 112 will not operate and is therefore not communicatively coupled to processing system 108. Accordingly, the connection device 112 cannot operate and provide connectivity between the processing system 108b and the system or peripheral device 110 in an unpowered state.

In practice, using the simplified illustrative example of FIG. 1, the network administrator communicates an authorization to the processing system 108b indicating that the connection device is authorized. This authorization is communicated into the communication system 104 via connection 114. The authorization is received by the processing system 108b via connection 116. Communication system 104 may be an inter-company or intra-company network, for example. Communication of the authorization from the system administrator device 106, through the connection 116, and onto the processing system 108b, is not described in detail herein for brevity.

Figure 2:
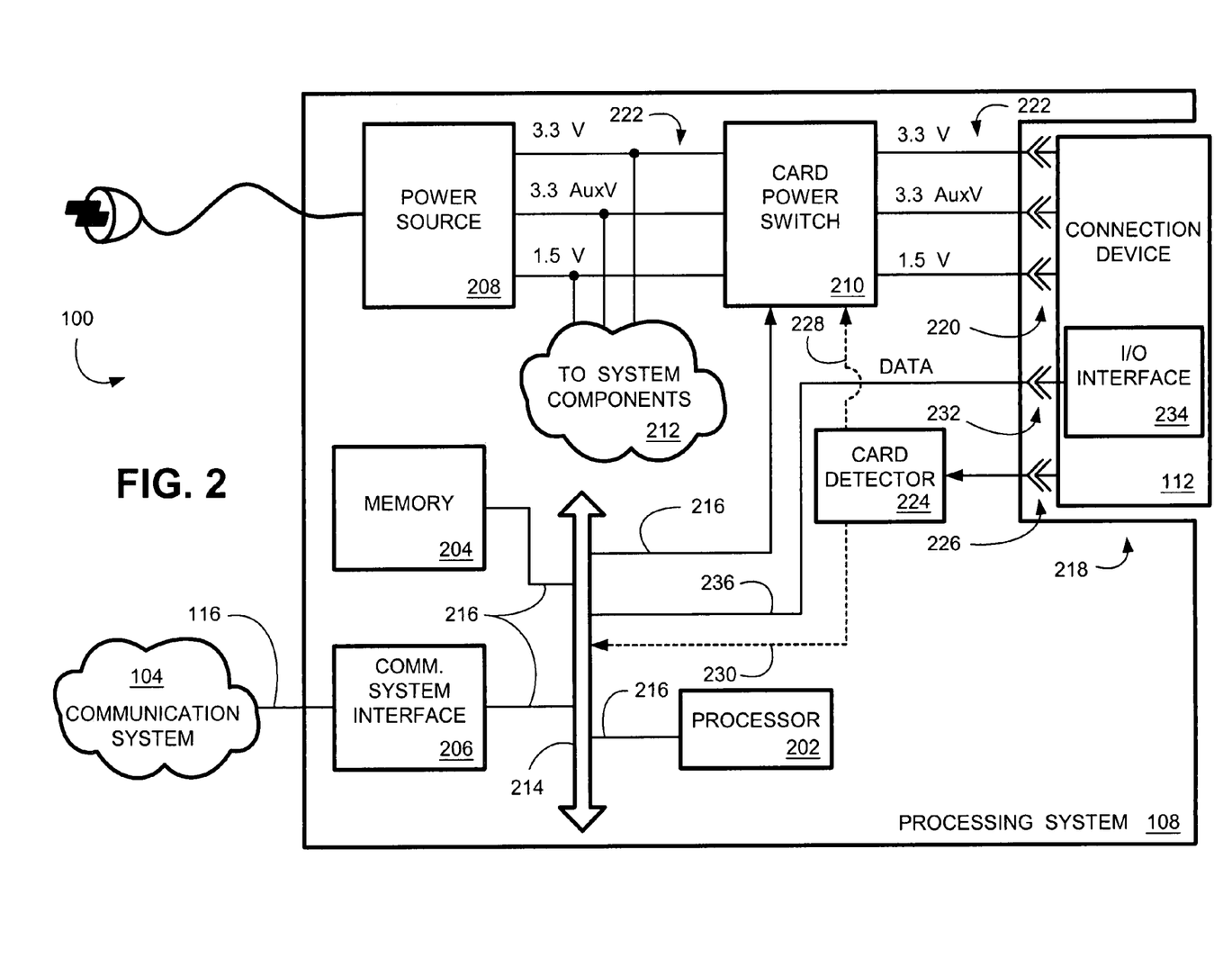
FIG. 2 is a block diagram illustrating an embodiment of a device authorization system implemented in a processing system.

FIG. 2 is a block diagram illustrating an embodiment of a device authorization system 100 implemented in a processing system 108 (corresponding to one of the processing systems 108a-108i of FIG. 1). Processing system 108 comprises a processor 202, a memory 204, a communication system interface 206, a power source 208, a card power switch 210, and a plurality of other system components 212. Processor 202, memory 204, communication system interface 206, power source 208, card power switch 210, and the plurality of other system components 212 are coupled to communication bus 214, via connections 216, thereby providing connectivity to the above-described components. In alternative embodiments of processing system 108, the above-described components are connectivley coupled to each other in a different manner than as illustrated in FIG. 2. For example, one or more of the above-described components may be directly coupled to processor 202 or may be coupled to processor 202 via intermediary components (not shown).

Also included on processing system 108 is a receptacle 218 that is configured to receive the intermediary connection device 112. Receptacle 218 may be any suitable slot or connector configured to receive the connection device 112. Accordingly, there are a plurality of wire connectors configured to couple with corresponding wire connectors of the connection device 112.

Connectors 220, when coupled to the corresponding connectors of the connection device 112, couple the power source 208 to the connection device 112. In an illustrative embodiment of processing system 108, the three connectors 220 provide power at 3.3 volts (V), at 1.5 V and at 3.3 auxiliary volts (Aux V), via the three power lines 222 (also referred to a "power rails" or the like). It is to be understood that any suitable number of power connections, and at any suitable voltage and/or current, may be employed by various embodiments.

Card detector 224 detects the presence of the connection device 112 when connector 226 is coupled to the corresponding connector of the connection device 112. Accordingly, when the connection device 112 is inserted into the receptacle 218, card detector 224 senses the presence of the connection device 112, and communicates a detect signal. For convenience, the embodiment illustrated in FIG. 2 employs the connector 226 to detect presence of the connection device 112 when coupled to a dedicated, corresponding connector of the connection device 112. In other embodiments, other multiple-use connections may be used to detect the presence of a connection device 112. Alternatively, any suitable sensor, such as a contact switch or the like, may be used to detect the presence of a connection device 112.

In one embodiment, the communicated detect signal is received by the card power switch, via connection 228. Upon receiving the detect signal, card power switch 210 is actuated such that power is provided to the connection device 112. In another embodiment, the detect signal is communicated to communication bus 214 such that processor 202 (or another component) understands that connection device 112 is present. Processor 202 communicates a signal, via the communication bus 214 and connections 216, to the card power switch 210 such that card power switch 210 is actuated to provide power to connection device 112.

When the power is provided to the connection device 112, the connection device 112 becomes communicatively coupled to the processing system 108. In one embodiment, coupler 232 couples the communication bus 214 and an input output (I/O) interface 234 of connection device 112. Accordingly, data may be communicated over I/O connection 236 between the processing system 108 and the connection device 112. It is understood that connection device 112 may be communicatively coupled to any suitable system or peripheral device, and that the I/O interface 234 may employ any suitable number of wire paths such that data is communicated over a corresponding number of wire paths residing in I/O connection 236. An example of data formats that can be used by I/O interface 234 and I/O connection 236 include the PCI (Peripheral Component Interconnect) format. Other suitable formats include the USB (Universal Serial Bus) format, ISA (Industry Standard Architecture), PCI Express, or various packet-based communication formats.

Figure 3:
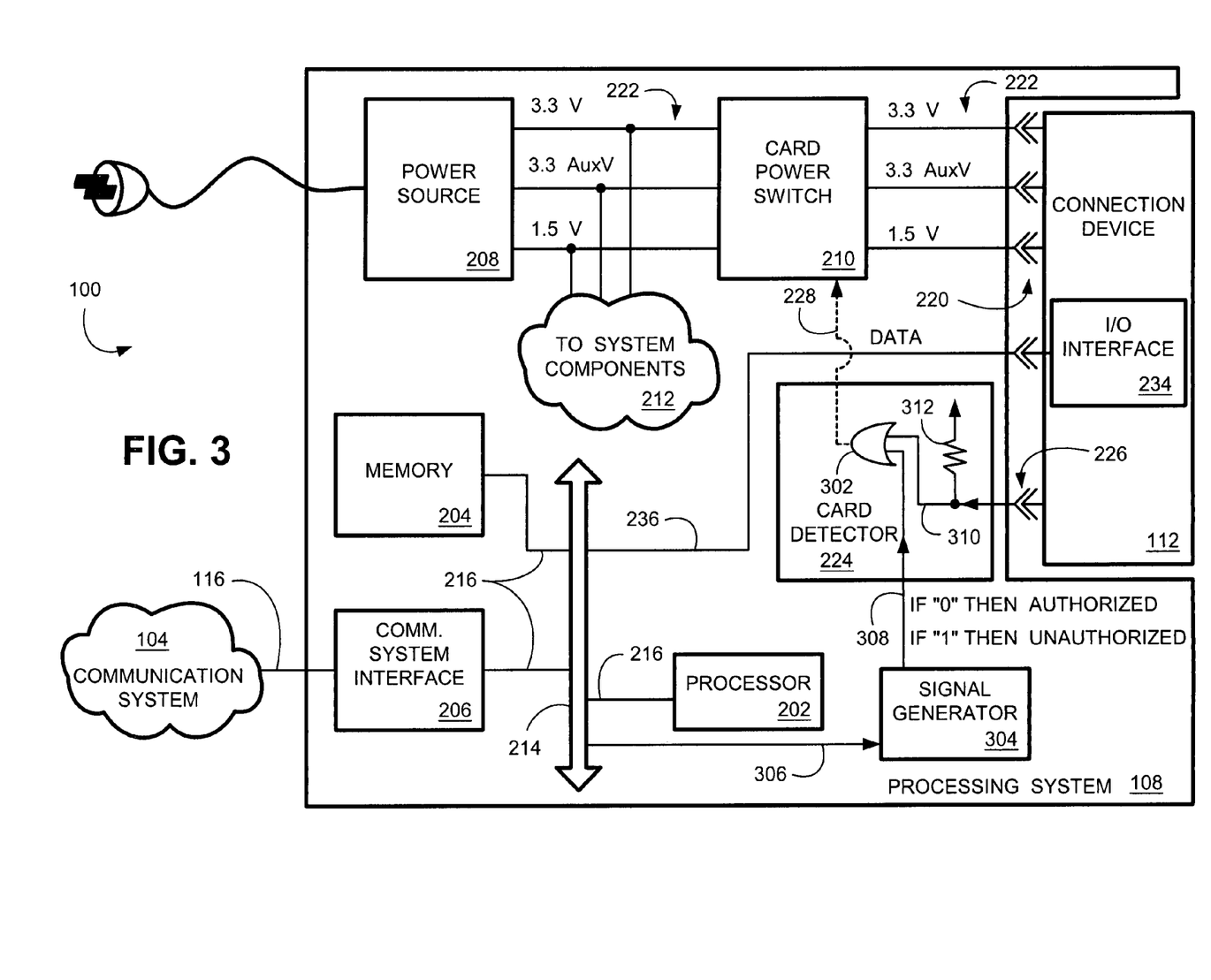
FIG. 3 is a block diagram illustrating another embodiment of a device authorization system implemented in a processing system wherein the card detector employs an OR logical gate to provide authorization to power the connection device.

FIG. 3 is a block diagram illustrating another embodiment of a device authorization system 100 implemented in a processing system wherein the card detector 224 employs an OR logical gate 302 to provide authorization to power the connection device 112. If an authorization signal is received by the signal generator 304, via connection 306, the signal generator outputs a signal corresponding to a logical "0" or a "low state" voltage to indicate authorization on connection 308. Accordingly, card power switch 210 may be actuated to provide power to connection device 112.

If the connection device 112 is not authorized to be communicatively coupled to the processing system 108, then an unauthorized signal is received by the signal generator 304, via connection 306. The signal generator outputs a signal corresponding to a logical "1" or a "high state" voltage to indicate no authorization on connection 308. Accordingly, card power switch 210 cannot be activated to provide power to communication device 112.

For convenience, connection 306 is illustrated as being coupled to communication bus 214 such that the authorization/unauthorization signal may originate from the processor 202, may be communicated directly from the system administrator device 106 via communication system 104 (FIG. 1), may be stored in memory 204 (or another suitable memory element) and detected by the signal generator 304, or may be generated from a physical switch device (not shown) coupled to or residing on the processing system 108. The source of the authorization/unauthorization signal may be provided to the signal generator 304 in any suitable, secure manner.

As noted above, signal generator 304 outputs a logical "0" in response to the authorization signal and a logical "1" in response to an unauthorization signal. Thus, the signal generator, in one embodiment, is an amplifier/inverter device that converts the received authorization/unauthorization signal into the logical "0" or "1" states, respectively. The components of the signal generator 304 could be comprised of a nearly infinite number of components that are configured to generate the logical "0" or "1" states.

When no connection device 112 is present, the pull-up resistor 312 causes the connection 310 to be in a logical "1" state. When connection device 112 is coupled to the processing system 108, connector 226 is coupled to the corresponding connector of the connection device 112. Thus, when the connection device 112 is inserted into the receptacle 218, card detector 224 senses the presence of the connection device 112. Accordingly, connection 310 is placed in a logical "0" state.

When either of the connections 308 or 310 are in a logical "1" state, the output of the OR logical gate 302 is a logical "1" state or a "high voltage" state. When both of the connections 308 or 310 are in a logical "0" state, the output of the OR logical gate 302 is a logical "0" state or a "low voltage" state. The output of the OR logical gate 302 is communicated to the card power switch 210, via connection 228. This output of the OR logical gate 302, in this embodiment, corresponds to the above-described authorization signal provided to the card power switch 210.

When the output of the OR logical gate 302 is a logical "0" state, the card power switch 210 is configured to recognize the presence of the connection device 112 (because connection 310 is in a logical "0" state) and the presence of an authorization signal (because connection 308 is in a logical "0" state). Thus, power is provided to the connection device 112 such that the connection device 112 and the processing system 108 are communicatively coupled together. That is, switches (not shown) residing in the card power switch 210 that control power on the connections 222 are closed.

When the output of the OR logical gate 302 is a logical "1" state, the card power switch 210 is configured to recognize either the absence of the connection device 112 (because connection 310 is in a logical "1" state) and/or the presence of an unauthorization signal (because connection 308 is in a logical "1" state). Accordingly, card power switch 210 does not provide power. That is, switches (not shown) residing in the card power switch 210 that control power on the connections 222 are open. Therefore, in the absence of an authorization signal (to cause connection 308 to be in a logical "0" state), connections 308 and 228 will be in a logical "1" state such that the card power switch does not provide power.

The embodiment of card detector 224 described above in relation to FIG. 2 comprised the OR logical gate 302 and the pull-up resistor 312 to cause the connections 308, 310 and 228 to being the various logical "1" or "0" states. Other embodiments of card detector 224 may comprise other components that provide the same or similar functionality. Thus, combinations of OR, AND, NAND or NOR gates, or other gate-like logic devices, are employed in alternative embodiments.

Since the components of the card detector 224 may vary, and the various states of connections 308, 310 and/or 228 could be comprised of a nearly infinite number of logical "0" or "1" states, the logical states of the connections 308, 310 and/or 228 could be configured into various combinations of states to provide the same functional effect for controlling the card power switch 210. Also, an embodiment of card power switch 210 may be configured to provide power when receiving a logical "1" state on connection 228.

In another embodiment, the signal generator 304 is omitted. The authorization/unauthorization signal in the logical "0" or "1" states, respectively, is provided directly onto connection 308 from another source. For example, the authorization/unauthorization signal may be communicated from communication bus 214 (from another device), or may be communicated directly from processor 202, onto the connection 308.

Figure 4:
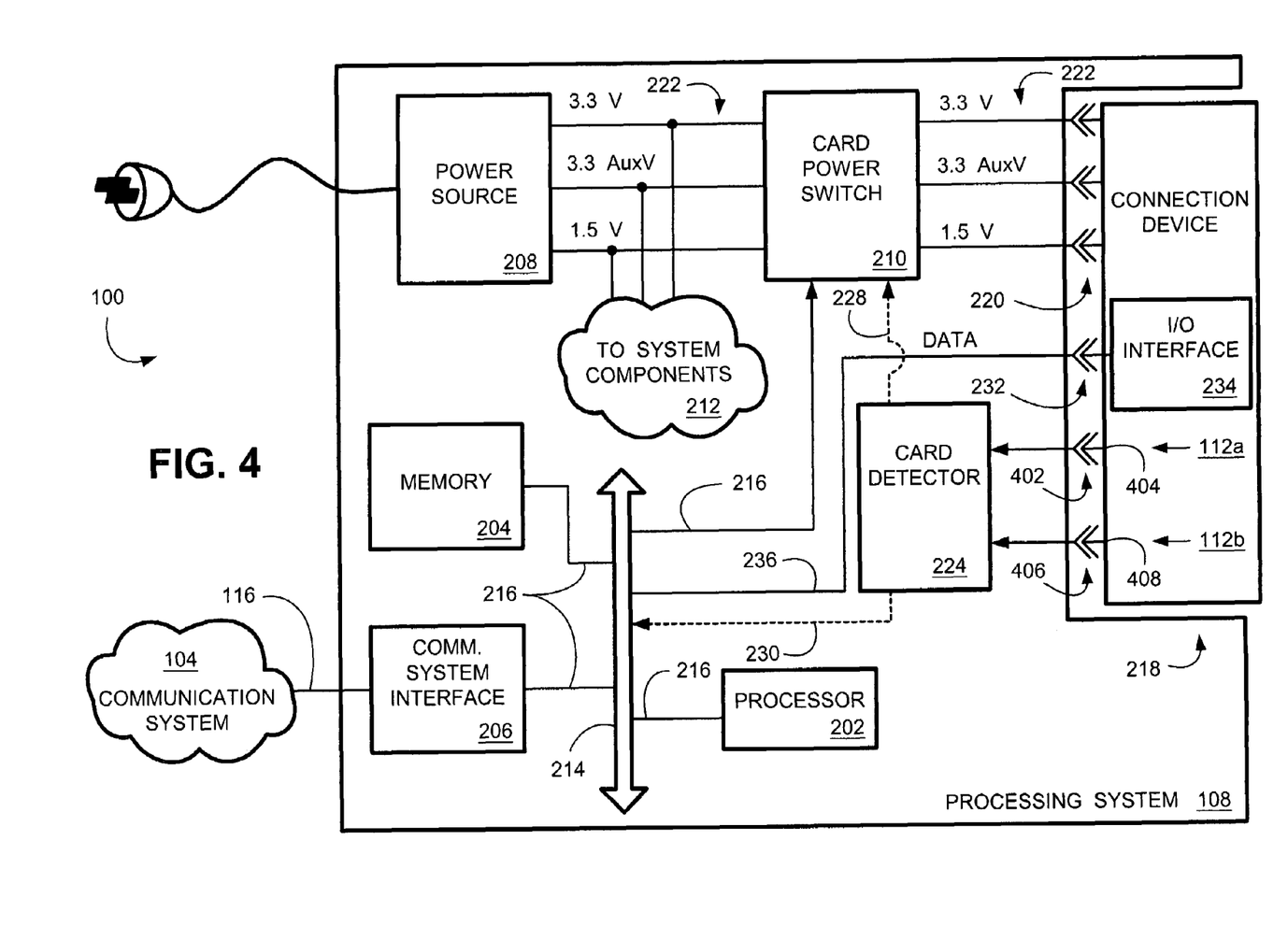
FIG. 4 is a block diagram illustrating another embodiment of a device authorization system implemented in a processing system wherein the card detector provides authorization to power two different connection devices, each configured to use the same receptacle.

FIG. 4 is a block diagram illustrating another embodiment of a device authorization system 100 implemented in a processing system 108 wherein the card detector 224 provides authorization to power two different connection devices 112a/b, each configured to use the same receptacle 218. Connection device 112a is a first type of connection device that has unique power requirements, provided by card power switch 210. Connection device 112b is a second type of connection device that has different unique power requirements, also provided by card power switch 210. When connection device 112a is authorized to be communicatively coupled to processing system 108, card power switch 210 selectively actuates internal switches (not shown) to provide the unique power requirements of connection device 112a. Similarly, when connection device 112b is authorized to be communicatively coupled to processing system 108, card power switch 210 selectively actuates internal switches (not shown) to provide the unique power requirements of connection device 112b. The authorization/unauthorization process used by this embodiment are similar to the embodiment described in FIG. 2, and are therefore not described again for brevity.

The processing system 108 may use a single receptacle 218 to accommodate communication connectivity to different types of connection devices. Accordingly, a first connector 402 detects the presence of a first type of connection device 112a when connector 402 is coupled to the corresponding connector 404 of a connection device 112a. Similarly, a second connector 406 detects the presence of a second type of connection device 112b when connector 406 is coupled to the corresponding connector 408 of the connection device 112b. Notably, the connector 408 may or may not be included with connection device 112a, and the connector 406 may or may not be included with connection device 112b, depending upon the type of connection device coupled to processing system 108.

In other embodiments, the processing system 108 may be configured to have more than two connectors that provide signals to the card detector 224. Accordingly, the processing system 108 may be configured to communicatively couple to three or more different types of connection devices, and thereby provide unique power requirements to three or more coupled connection devices. In yet another embodiment, a connection device may utilize both connectors 402 and 406.

One non-limiting example of two different connection devices 112a/b includes connection devices defined under the ExpressCard standard. One type of ExpressCard connection device provides for a PCI Express interconnect between the processing system 108 and a PCI Expressconnection device. A second type of ExpressCard connection device provides for a USB interconnect between the processing system 108 and a USB connection device. Since the power requirements of the PCI Express connection device and the USB connection device are different, the above-described embodiment facilitates authorized connectivity between the processing system 108 and a PCI Express connection device, or between the processing system 108 and a USB connection device.

Figure 5:
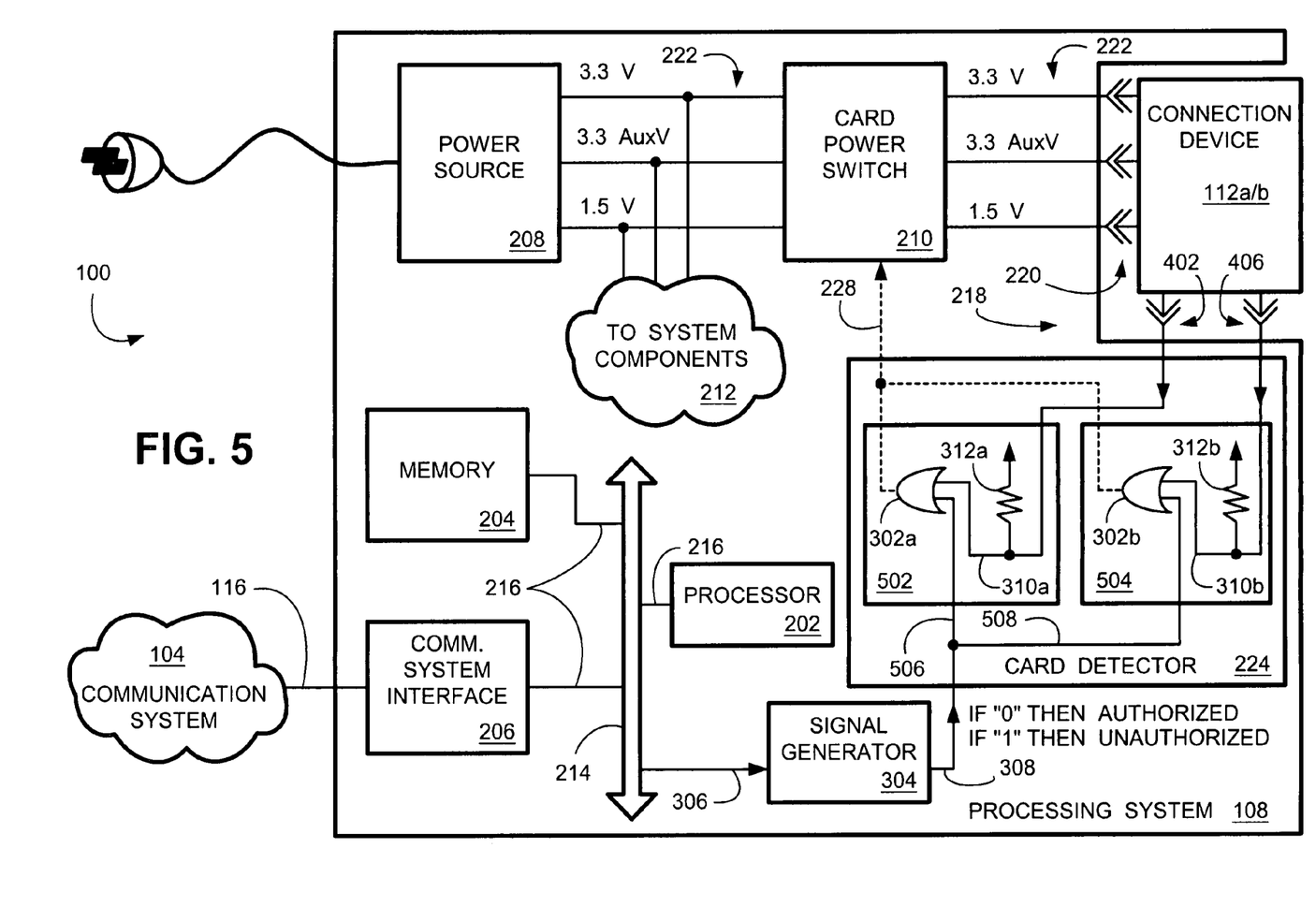
FIG. 5 is a block diagram illustrating another embodiment of a device authorization system implemented in a processing system wherein the card detector employs two OR logical gates to provide authorization to power two different connection devices, each configured to use the same receptacle.

FIG. 5 is a block diagram illustrating another embodiment of a device authorization system 100 implemented in a processing system 108 wherein the card detector 224 employs two OR logical gates 302a-b to provide authorization to power two different connection devices 112a/b (see also FIG. 4), each connection device being configured to use the same receptacle 218. As described above, connection device 112a is a first type of connection device that has unique power requirements satisfied by card power switch 210. Connection device 112b is a second type of connection device that has unique power requirements also satisfied by card power switch 210.

With this embodiment, the card detector 224 comprises a first OR logical gate unit 502 and a second OR logical gate unit 504. The first OR logical gate unit 502 provides detection of the above-described first type of connection device 112a and the second OR logical gate unit 504 provides detection of the above-described first type of connection device 112b.

The first OR logical gate unit 502 comprises an OR logical gate 302a and a pull-up resistor 312a. The second OR logical gate unit 504 comprises an OR logical gate 302b and a pull-up resistor 312b. The logical gates 302a/b and the pull-up resistors 312a/b operate similarly to the above-described logical gate 302 and pull-up resistor 312 (FIG. 3), and are therefore not described for purposes of brevity.

When the connection devices 112a/b are authorized, signal generator 304 provides the above-described logical "0" signal on connection 308, which is communicated onto both connections 506 and 508. Thus, the logical "0" signal is received by both OR logical gate units 502 and 504. When the connection devices 112a/b are not authorized, signal generator provides the above-described logical "1" signal to both OR logical gate units 502 and 504. Thus, power is provided, or not provided, to the connection devices 112a/b depending upon the signal received from signal generator 304.

In an alternative embodiment, connections 506 and 508 are separately coupled to the signal generator 304. Accordingly, the first connection device 112a may be selectively authorized, and the second connection device 112b may be selectively unauthorized (or vice versa).

In the case of the embodiments illustrated in FIGS. 2 and 3, the embodiments illustrated in FIGS. 4 and 5 may be configured in any of the above described variations and/or alternative embodiments. Similar to the above-described alternative embodiment, wherein three or more different connectors are used to communicatively couple three or more different types of connection devices with unique power requirements, three or more of the OR logical gate units 502 may be used to control authorization to three or more different types of connection devices.

Figure 6:
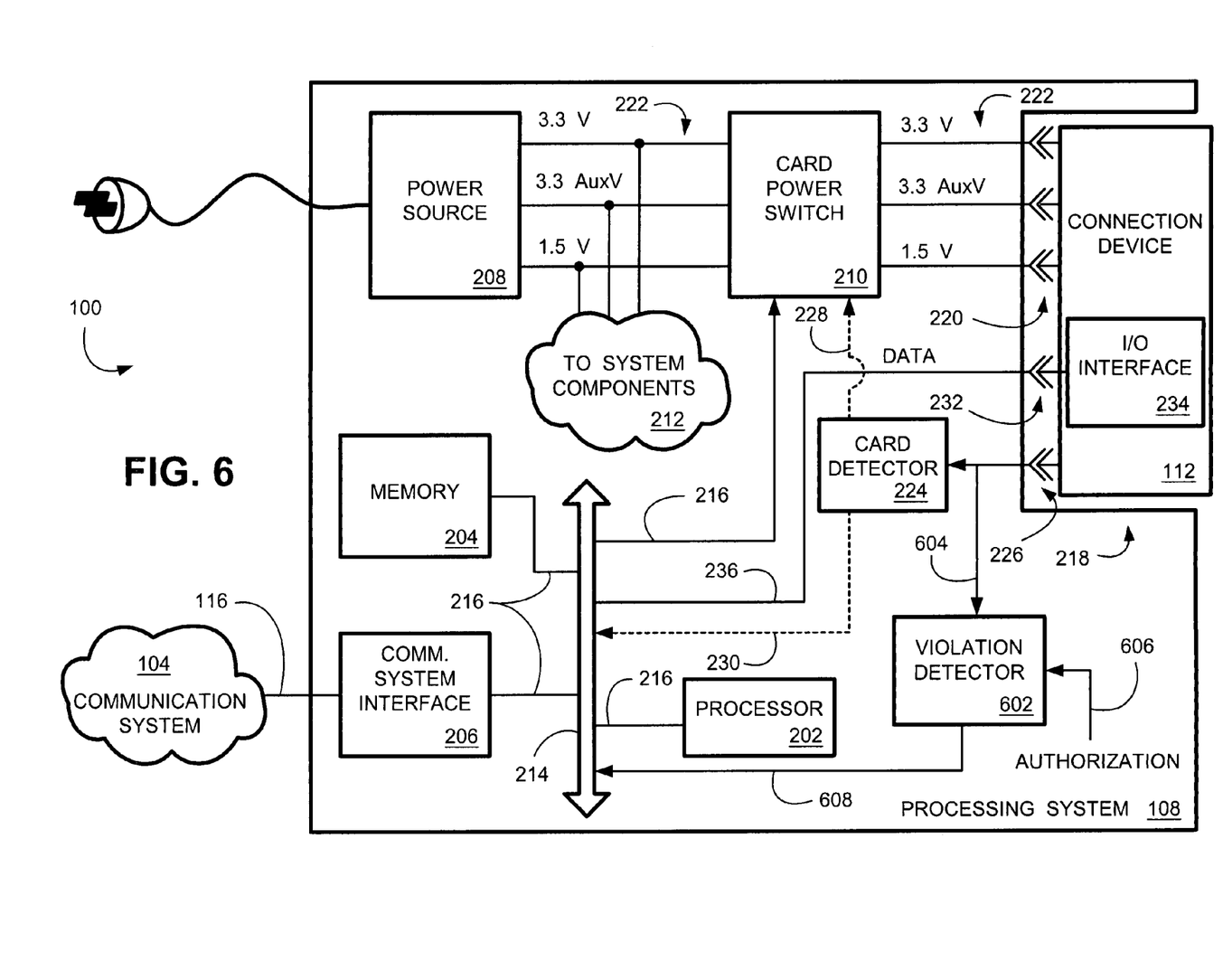
FIG. 6 is a block diagram illustrating an embodiment of a device authorization system implemented in a processing system wherein a violation detection is determined.

FIG. 6 is a block diagram illustrating an embodiment of a device authorization system 100 implemented in a processing system 108 wherein a violation detection is determined. A signal corresponding to the detected violation is then communicated back to the system administrator device 106 (FIG. 1). A violation detection indicates that a user of the processing system 108 has inserted a connection device 112 into the receptacle 218 when that connection device is not authorized to be communicatively coupled to the processing system 108. When the unauthorized connection device 112 is inserted into the receptacle 218, the connection device 112 will not be powered. In some situations, however, an unauthorized connection device 112 may not require power for operation, or may have its own power source (and therefore, not require power from the power source 208). In such situations, the violation detector generates a violation signal. The violation signal is then communicated to the system administrator device 106 (FIG. 1) such that the network administrator or other individual is notified of the violation.

In the case of authorization, a signal corresponding to detection of the connection device 112 is communicated to the violation detector 602 via connection 604. If the connection device 112 is authorized, an authorization signal will be received by the violation detector via connection 606. Since the connection device 112 is authorized in this exemplary example, no violation signal is generated upon detection of the connection device 112.

However, in the case of no authorization, a signal corresponding to detection of the connection device 112 is communicated to the violation detector 602, via connection 604. If the connection device 112 is unauthorized, an unauthorization signal (or no signal, corresponding to no authorization) will be received by the violation detector, via connection 606. Since the connection device 112 is not authorized in this exemplary example, a violation signal is generated upon detection of the connection device 112. The violation signal is then communicated to the system administrator device 106 (FIG. 1).

The violation signal is illustrated as being communicated over connection 608 onto communication bus 214. However, the violation signal may be communicated to the system administrator device 106 (FIG. 1) using any suitable path, communication medium, and/or communication device in alternative embodiments.

Figure 7:
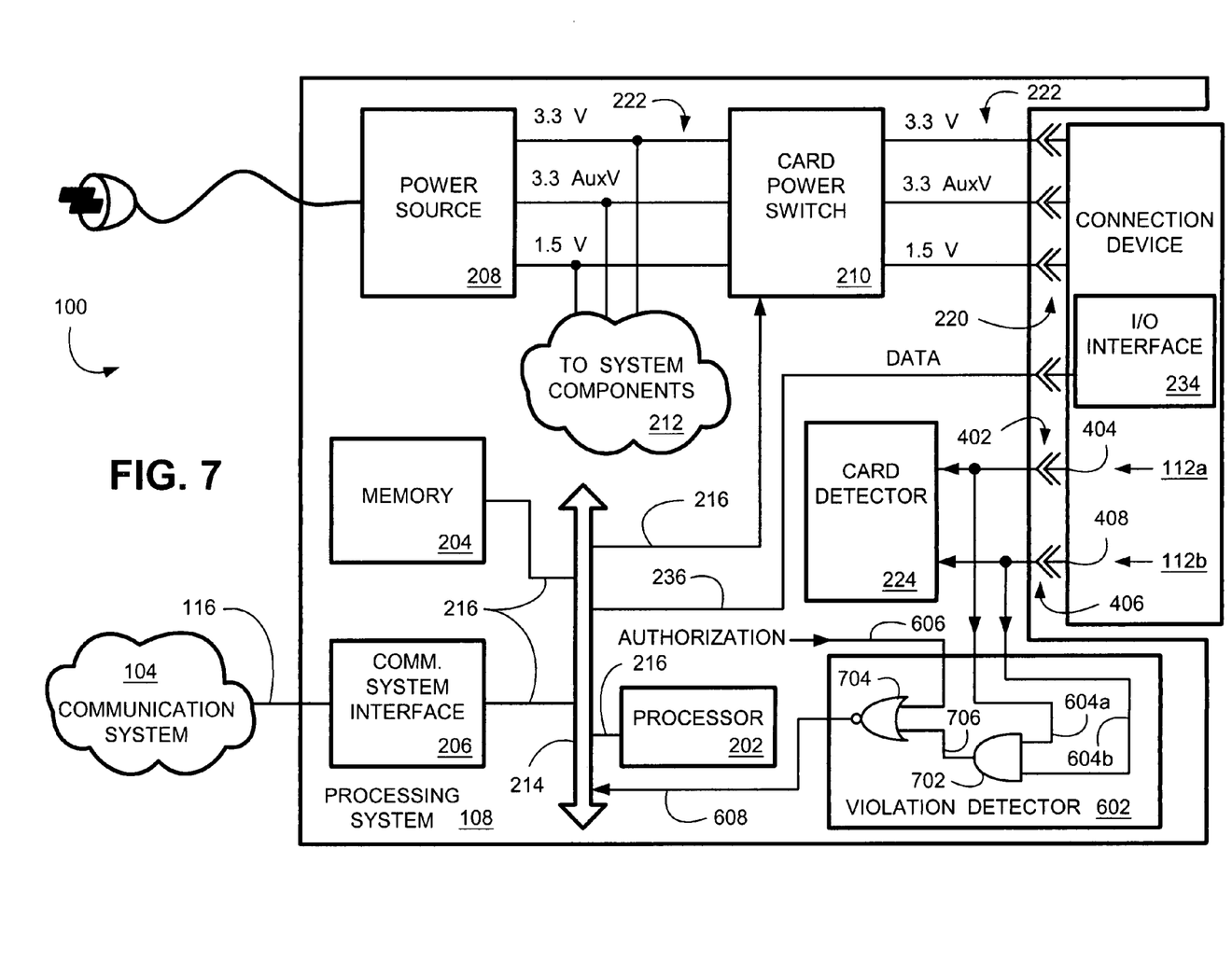
FIG. 7 is a block diagram illustrating an embodiment of the violation detector configured to detect presence of two different connection devices, each configured to use the same receptacle.

FIG. 7 is a block diagram illustrating an embodiment of the violation detector configured to detect the presence of two different connection devices, each configured to use the same receptacle. In this exemplary embodiment, an AND gate 702 is configured to detect the presence of one of the connection devices 112a/b via connections 604a or 604b. The output of the AND gate 702 is a logical "1" when both connectors 604a/b are at a logical "1" state. A NOR (not OR) gate 704 receives the output of the AND gate 702 via connection 706. Also, the NOR gate 704 receives an authorization signal on connection 606. When an unauthorized device 112a/b is coupled to the processing system 108, the output of the NOR gate 704 becomes a logical "1" state, thereby indicating a violation condition.

In other embodiments, the components of a violation detector 602 (and therefore, the various states of connections 702, 606 and/or 604a/b) are comprised of various combinations of logic configured to generate various logical "0" or "1"

states. Thus, combinations of OR, AND, NAND or NOR gates, or other gate-like logic devices, are employed in alternative embodiments.

As described above, an authorization signal is communicated from the administrator device 106 (FIG. 1). The generation and/or communication of the authorization device is preferably password protected such that only an authorized individual may issue the authorization for a particular connection device to be communicatively coupled to a particular processing system 108. Any suitable password protection scheme, device or system may be used by embodiments of the device authorization system 100.

In one embodiment, the communicated authorization signal received by the processing device is saved into memory 204. Accordingly, if a connection device 112 that is intended to be authorized is later coupled to the processing device, a determination can be made whether the coupled connection device 112 is authorized by retrieving the authorization from memory 204. In other embodiments, the authorization is stored in another suitable memory medium.

In one embodiment, a processing device receives a signal from the administrator device 106 (FIG. 1) indicating that a particular connection device 112 is either authorized or unauthorized. In another embodiment, the absence of an authorization (or unauthorization) is interpreted as an unauthorized condition wherein any connection device 112 coupled to the processing device will not be powered by power source 208 (FIGS. 1-7). In yet another embodiment, the absence of an authorization (or unauthorization) is interpreted as an authorized condition wherein any connection device 112 coupled to the processing device will be powered by power source 208 (FIGS. 1-7).

Figure 8:
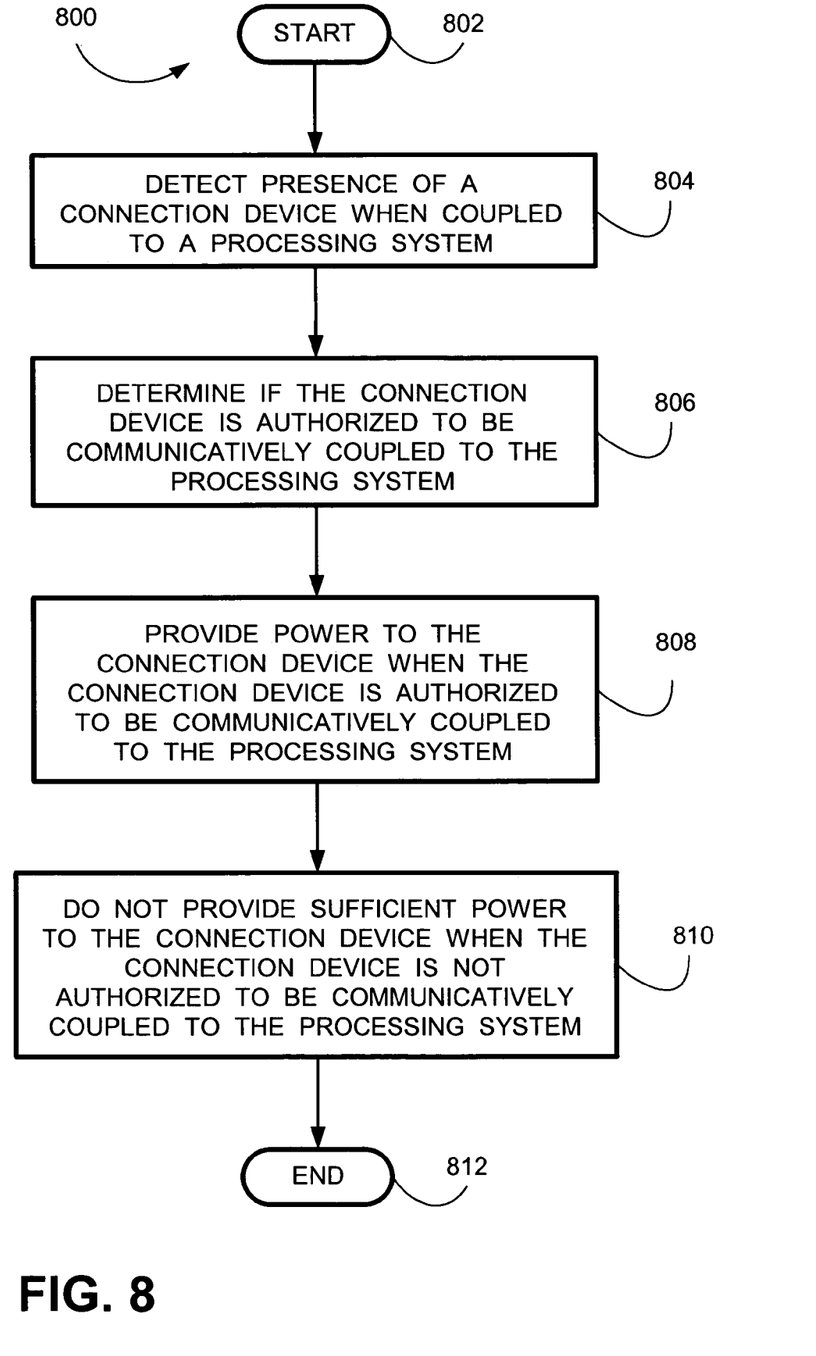
FIG. 8 is a flowchart illustrating an embodiment of a process for authorizing a connection device to be communicatively coupled to a processing system.

FIG. 8 is a flowchart 800 illustrating an embodiment of a process for authorizing a connection device 112 to be communicatively coupled to a processing system 108 (FIGS. 1-7). Blocks illustrated in FIG. 8 may represent a module, segment or portion of code, which comprises one or more executable instructions for implementing the specified logical function(s). It should also be noted that in alternative embodiments, the functions noted in the blocks may occur out of the order noted in FIG. 8, or may include additional functions. For example, two blocks shown in succession in FIG. 8 may in fact be substantially executed concurrently, the blocks may sometimes be executed in the reverse order, or some of the blocks may not be executed in all instances, depending upon the functionality involved, as will be further clarified herein.

The process begins at block 802. At block 804, the presence of a connection device when coupled to a processing system is detected. At block 806, whether the connection device is authorized to be communicatively coupled to the processing system is determined. At block 808, power to the connection device is provided when the connection device is authorized to be communicatively coupled to the processing system. Alternatively, at block 810, power to the connection device is not provided when the connection device is not authorized to be communicatively coupled to the processing system. The process ends at block 812.

Figure 9:
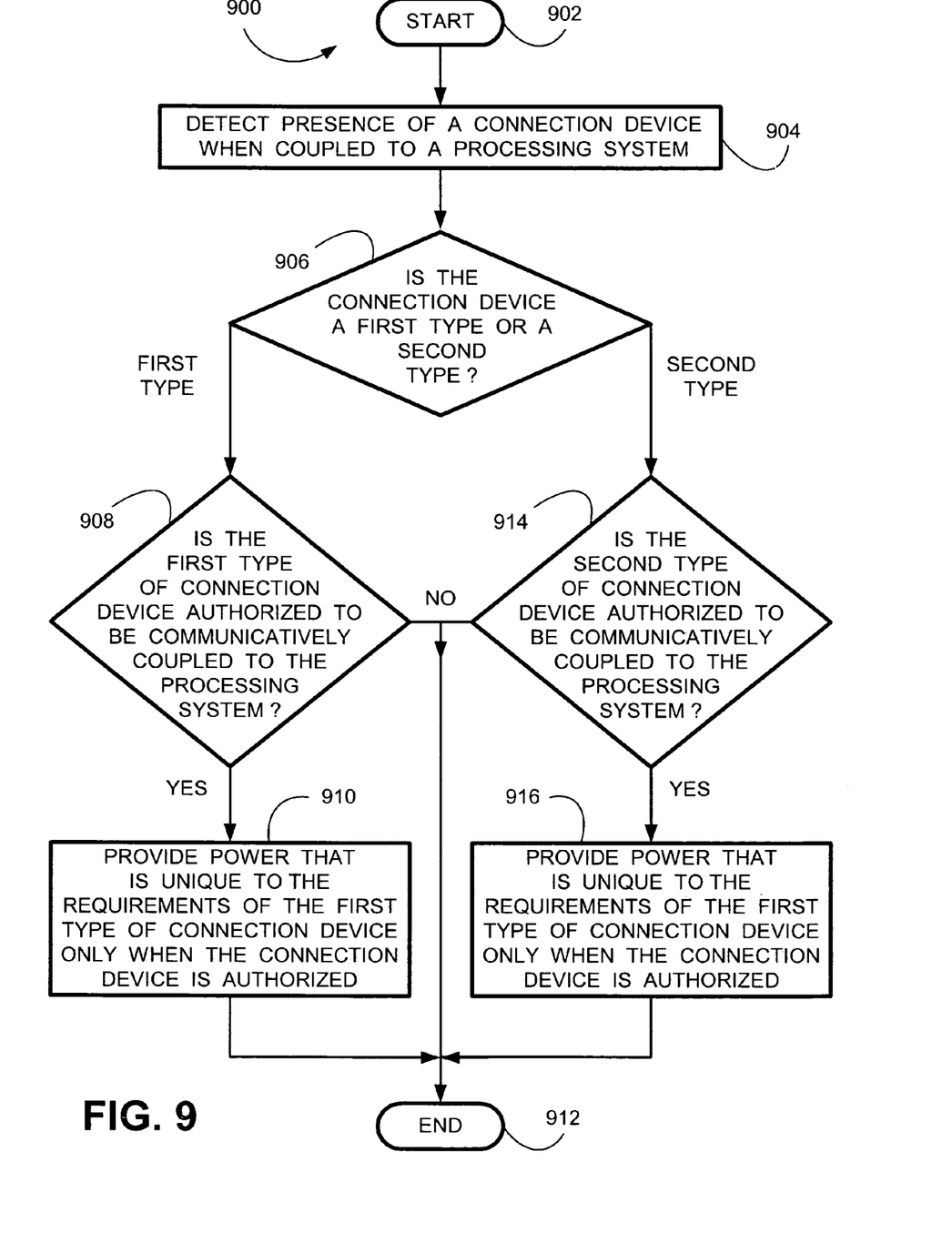
FIG. 9 is a flowchart illustrating another embodiment of a process for authorizing two different types of connection devices that use the same receptacle to communicatively coupled to the processing system.

FIG. 9 is a flowchart illustrating another embodiment of a process for authorizing two different types of connection devices 112*a/b* (FIG. 4, 5 or 7) that use the same receptacle 218 to communicatively coupled to the processing system 108 (FIG. 4, 5 or 7). The process starts at block 902. At block 904, the presence of a connection device 112*a/b* when coupled to the processing system 108 is detected. At block 906 the processing system 108 determines if the connection device 112*a/b* is a first type of connection device (for example, 112*a*) or a second type of connection device (for example 112*b*).

At block 908, if the connection device 112*a/b* is a first type of connection device, the processing system 108 determines if the first type of connection device is authorized to be communicatively coupled to the processing system 108. If the first type of connection device is authorized (the "YES" condition), the first type of connection device is provided power that is unique to the requirements of the first type of connection device at block 910. If the first type of connection device is not authorized (the "NO" condition), sufficient power is not provided and the process ends at block 912.

Alternatively, at block 914, if the connection device 112*a/b* is a second type of connection device, the processing system 108 determines if the second type of connection device is authorized to be communicatively coupled to the processing system 108. If the second type of connection device is authorized (the "YES" condition), the second type of connection device is provided power that is unique to the requirements of the second type of connection device at block 916. If the second type of connection device is not authorized (the "NO" condition), power is not provided and the process ends at block 912.

Embodiments of the invention implemented in memory 204 (FIGS. 2-7) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

It should be emphasized that the above-described embodiments are merely examples of the disclosed system and method. Many variations and modifications may be made to the above-described embodiments. All such modifications and variations are intended to be included herein within the scope of this disclosure and protected by the following claims.

I claim:

1. A computer comprising:
    a network interface configured to receive via a network authorization from a remote network administrator device for the computer to use a modem card that facilitates connectivity between the computer and other devices;
    a card slot configured to receive the modem card;
    a card detector configured to detect the presence of the modem card when the modem card is inserted into the card slot; and
    a card power switch configured to supply power to the modem card only when the authorization has been received and the card detector detects the presence of the modem card within the card slot.

2. The computer of claim 1, wherein the modem card connects to the computer with a Universal Serial Bus (USB) connection.

3. The computer of claim 1, wherein the modem card connects to the computer with a Peripheral Component Interconnect (PCI) Express connection.

4. The computer of claim 1, wherein the modem card connects to the computer with an Industry Standard Architecture (ISA) connection.

5. The computer of claim 1, further comprising:
a memory configured to store the authorization from the network administrator device; and
a processor configured to retrieve the authorization from the memory and communicate it to the card power switch.

6. The computer of claim 1, wherein the card slot is configured to receive two different types of modem cards.

7. The computer of claim 6, wherein the card power switch is configured to provide a first power to a first type of modem card and a second power to a second type of modem card, the first power being different than the second power.

8. The computer of claim 1, further comprising:
a signal generator configured to generate an authorization signal for the card power switch; and
a logical OR gate comprising:
   a first input coupled to the signal generator,
   a second input coupled to a connector configured to detect the presence of the modem card when inserted into the card slot, and
   an output coupled to the card power switch such that the authorization signal is generated by the output of the logical OR gate only when the computer is authorized to use the modem card and when presence of the modem card is detected.

9. The computer of claim 1, further comprising a violation detector configured to detect presence of the modem card and communicate a violation signal to the network administrator device when the computer is not authorized to use the modem card.

10. A method for controlling use of a modem card, the method comprising:
a computer detecting presence of the modem card when the modem card has been inserted into a card slot of the computer;
the computer determining whether authorization has been received from a remote network administrator device for the computer to use the modem card;
the computer providing power to the modem card if the authorization has been received and not providing power to the modem card if the authorization has not been received.

11. The method of claim 10, further comprising the computer receiving the authorization from the remote network administrator device via a network.

12. The method of claim 10, further comprising:
the computer generating an authorization signal when the computer is authorized to use the modem card; and
the computer communicating the authorization signal to a card power switch of the computer such that the card power switch provides power to the modem card when the computer is authorized to use the modem card.

13. The method of claim 10, wherein providing power comprises providing power that is unique to power requirements of the modem card.

14. The method of claim 10, further comprising:
the computer detecting presence of a second type of modem card when inserted into the card slot;
the computer determining if the computer is authorized to use the second type of modem card;
the computer providing power to the second type of modem card if the computer is authorized to use the second type of modem card; and
the computer not providing power to the second type of modem card if the computer is not authorized to use the second type of modem card.

15. The method of claim 14, wherein providing power to the second type of modem card comprises providing power that is unique to power requirements of the second type of modem card.

16. The method of claim 10, further comprising:
the computer determining that the computer is not authorized to use the modem card;
the computer generating a violation signal in response to determining that the computer is not authorized; and
the computer communicating the violation signal to the remote network administrator device via a network.

* * * * *